(12) United States Patent
Zenoni

(10) Patent No.: US 8,539,540 B2
(45) Date of Patent: Sep. 17, 2013

(54) INTERACTIVE ADVERTISING MONITORING SYSTEM

(75) Inventor: Ian A. Zenoni, Highlands Ranch, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 48 days.

(21) Appl. No.: 13/157,581

(22) Filed: Jun. 10, 2011

(65) Prior Publication Data

US 2011/0307921 A1 Dec. 15, 2011

Related U.S. Application Data

(60) Provisional application No. 61/355,100, filed on Jun. 15, 2010.

(51) Int. Cl.
*H04N 7/173* (2011.01)

(52) U.S. Cl.
USPC ............................ 725/115; 725/114; 725/119

(58) Field of Classification Search
USPC ............. 725/91, 93, 105, 114, 115, 116, 117, 725/118, 138, 144, 145, 146
See application file for complete search history.

(56) References Cited

U.S. PATENT DOCUMENTS

| 2006/0130120 A1* | 6/2006 | Brandyberry et al. ........ 725/136 |
| 2007/0091919 A1* | 4/2007 | Sandoval ....................... 370/466 |
| 2010/0313230 A1* | 12/2010 | Van Doorn et al. ........... 725/107 |

* cited by examiner

*Primary Examiner* — John Schnurr
(74) *Attorney, Agent, or Firm* — William W. Cochran; Cochran Freund & Young LLC

(57) ABSTRACT

Disclosed is an interactive advertising system that utilizes an analyzing tool that is capable of analyzing and displaying overlay data and signaling data that is transmitted to set top boxes to be displayed. If problems exist with the data, the analyzing tool is capable of storing and displaying the data for later analysis.

2 Claims, 3 Drawing Sheets

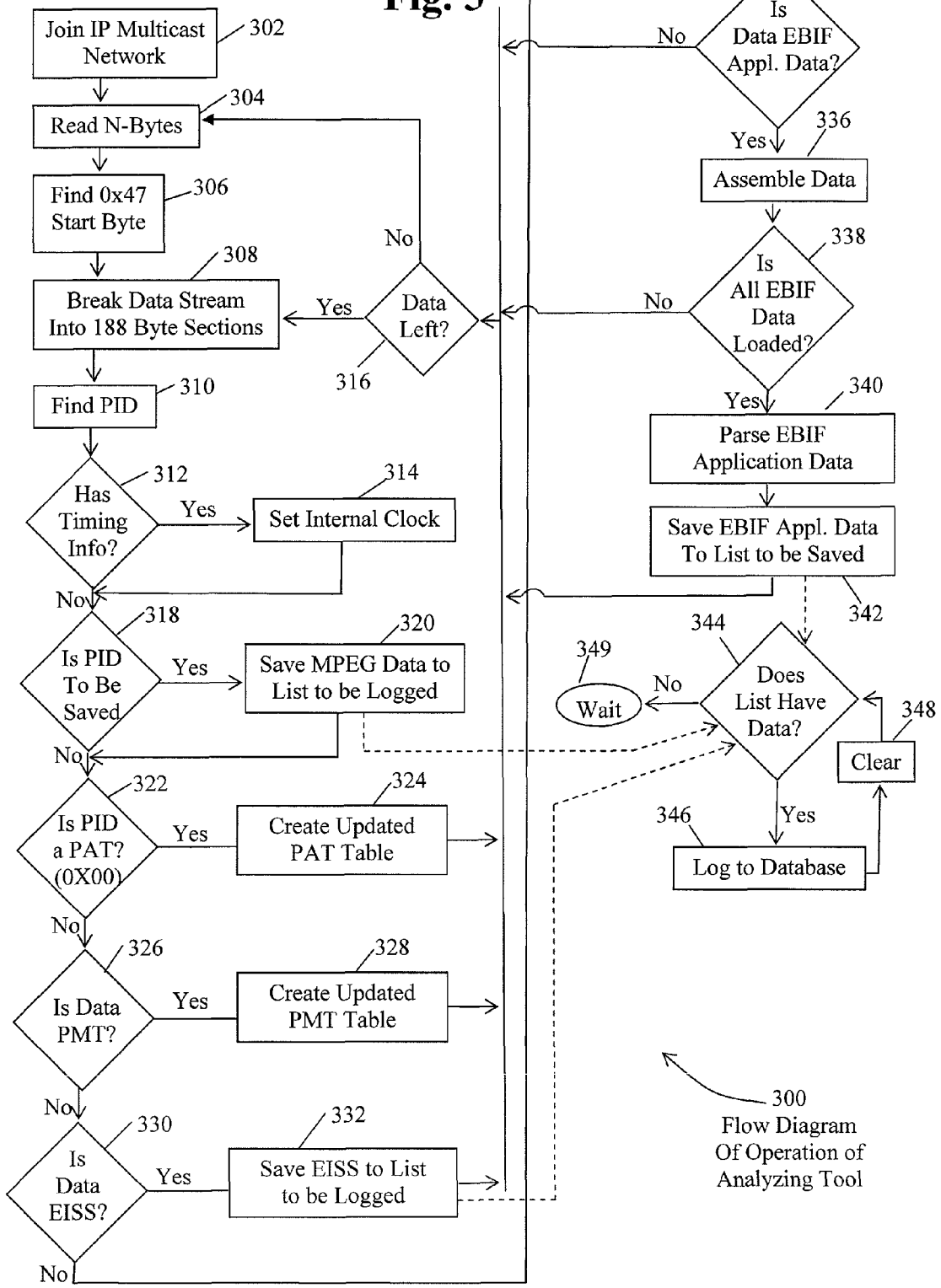

INTERACTIVE ADVERTISING MONITORING SYSTEM

CROSS-REFERENCE TO RELATED APPLICATION

The present patent application is based upon and claims the benefit of U.S. Provisional Patent Application Ser. No. 61/355,100, filed on Jun. 15, 2010, by Ian A. Zenoni, entitled "Interactive Advertising Monitoring System," which application is hereby specifically incorporated herein by reference for all that it discloses and teaches.

BACKGROUND

Interactive advertising has provided a unique and successful alternative to standard advertising practices used in television programming. Interactive advertising has been developed over the past few years and has resulted from the digital technology that has allowed transmission of television programming with interactive advertising to both private residences and commercial venues.

SUMMARY

An embodiment of the present invention may therefore comprise a method of analyzing interactive data in a data stream that is transmitted to set top boxes for display comprising: downloading N-bytes from the data stream; identifying start bytes in the N-bytes of the data stream; dividing the N-bytes into sections of the data stream; identifying overlay data in the sections; identifying signaling data in the sections; storing the overlay data and the signaling data; determining an identification tag for the overlay data and the signaling data; displaying the overlay data and the signaling data with the identification tag.

A system for analyzing interactive data in a data stream that is transmitted to set top boxes for display comprising: an analyzing tool comprising: a buffer that stores N-bytes of data from the data stream; a processor that divides the N-bytes of data into sections, identifies overlay data in the sections, identifies signaling data in the sections and associates an identification tag for sections containing the overlay data and the signaling data; a storage device that stores the sections containing the overlay data and the signaling data with the identification tag; a display that displays the overlay data and the signaling data with the identification tag.

BRIEF DESCRIPTION OF THE DRAWINGS

FIG. 3 is one embodiment of a schematic flow diagram for operating an analyzing tool.

DETAILED DESCRIPTION OF THE EMBODIMENTS

Figure 1:
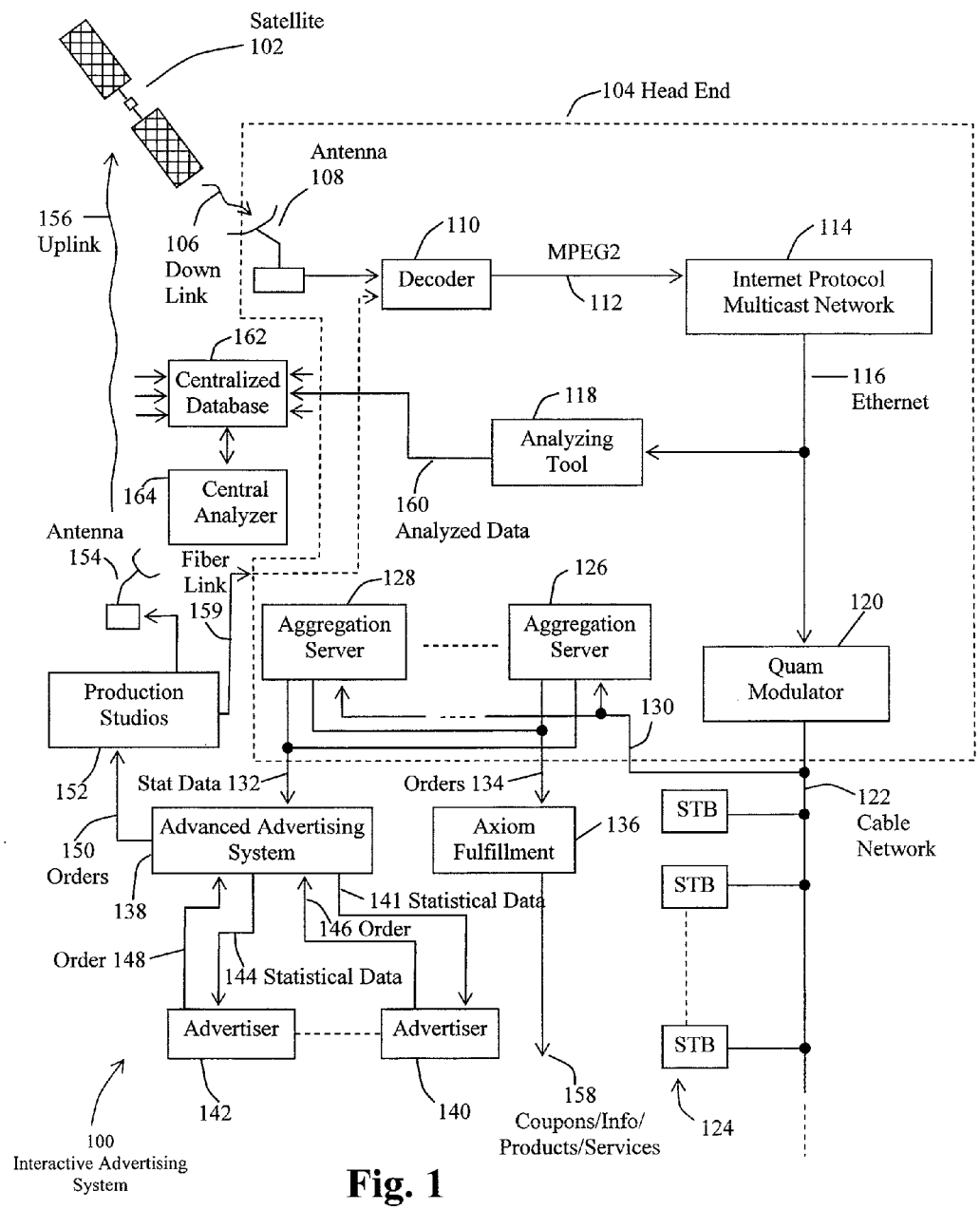
FIG. 1 is a schematic block diagram of one embodiment of an interactive advertising system utilizing an analyzing tool.

FIG. 1 is a schematic block diagram of one embodiment of an interactive advertising system 100. As shown in FIG. 1, a satellite 102 transmits data via downlink 106 to an antenna 108 located at head-end 104. Although not illustrated in FIG. 1, data is transmitted by satellite 102 to multiple head-ends. In addition, multiple different satellites transmit data via downlinks to multiple head-ends, such as head-end 104. A decoder 110 decodes the data received by antenna 108 and produces an MPEG-2 data stream 112 that is applied to an internet protocol multicast network 114. The internet protocol multicast network 114 typically uses a UDP protocol for broadcasting the MPEG-2 data over Ethernet connection 116. Analyzing tool 118 is connected to the Ethernet network and analyzes and monitors certain portions of the Ethernet data. The Ethernet data is also transmitted to a QUAM modulator 120, which generates an RF signal that is applied to the cable network 122. A plurality of set top boxes 124 are connected to the cable network 122. The set top boxes 124 may be located in private residences, commercial establishments, etc. Cable network 122 is also connected to a plurality of aggregation servers, such as aggregation servers 126, 128 via communication connector 130. Aggregation servers 126, 128 collect and aggregate data transmitted up stream on the cable network 122 by set top boxes 124. In particular, the aggregation servers 126, 128 receive and aggregate orders placed by set top box users on set top boxes 124 that are produced in response to interactive advertising that is generated by the set top boxes 124 on users' televisions, as explained in more detail below. Numerous different head-ends, such as head-end 104, are operated by numerous different multiservice operators (MSOs). In general, each MSO operates multiple aggregation servers at multiple head-ends, such as head-end 104.

As also shown in FIG. 1, the aggregation servers 126, 128 generate two different sets of data. Order data 134 comprises one set of data that is transmitted to a fulfillment center, such as AXIOM fulfillment center 136. In this instance, each of the orders placed by users and transmitted via set top boxes 124 is fulfilled by the fulfillment center 136. As one example, coupons 158 may be sent to customers in response to an order placed by a customer. In other examples, information and actual products or services may be provided by the fulfillment center 136. If coupons are provided, the coupons can be mailed by standard ground mail, or can be emailed as a printable coupon.

The other set of data generated by the aggregation servers 126, 128 is statistical data 132. Statistical data 132 simply provides statistical information as to the number of viewers who viewed a particular advertisement, how many orders were placed in response to the advertisement, and other similar data. The identification of the users is not provided because of privacy reasons. However, the location of the set top box 124 that has placed an order may be provided in the form of a zip code.

As also shown in FIG. 1, the statistical data 132 is transmitted to an advanced advertising system 138. The advanced advertising system 138 provides statistical data 144 to advertiser 142 and statistical data 141 to advertiser 140. Of course, multiple advertisers can receive statistical data for each advertisement that is run by each of the advertisers. The multiple advertisers 140, 142 can then view the statistical data. If desired, the advertisers can place additional orders, particularly if statistical data shows positive results. For example, advertiser 140 can place an order 146 that is sent to advanced advertising system 138. Similarly, advertiser 142 can place an order 148 that is sent to advanced advertising system 138. If the statistical data indicates that a particular advertisement was successful, the advertisers 140, 142 may place orders for the same ad or similar ads. The advanced advertising system 138 then transmits orders 150 to the multiple various production studios 152. The production studios 152 then process the orders 150 and transmit the orders to multiple head-ends, such as head-end 104, via fiber link 159, or antenna 154, via uplink 156 to satellite 102. Satellite 102 then uses downlink 106 to transmit the order to antenna 108, which then transmits the order to decoders, such as decoder 110, in multiple head-ends, such as head-end 104.

The orders placed by the set top boxes 124 are placed in response to an interactive ad generated by the production studios 152, which normally takes the form of an interactive overlay that appears on the user's television screen. For example, if an ad is being run for a particular product, the overlay may allow the user to request a discount coupon for the product, obtain information about a product, or may simply allow the user to order the product at a discounted price. Activation of the option provided in the overlay generates a signal from the set top box, which is transmitted upstream to the aggregation servers 126, 128, as disclosed above.

The analyzing tool 118, as disclosed above, is connected to the Ethernet network and analyzes the MPEG data. The analyzed data 160 is then transmitted to a centralized database 162. Centralized database 162 collects data from a plurality of different analyzing tools located at different head-ends, such as head-end 104, and other locations, such as production studios 152. The centralized database 162 stores the analyzed data 160, and other analyzed data from other analyzing tools, and creates a large database which is monitored to determine if any problems exist with the data. Central analyzer 164 analyzes all of the data stored in the centralized database 162 and presents that data on a monitoring screen. In addition, alarms can be set which can provide notification if a problem exists with the data.

Each of the set top boxes 124, illustrated in FIG. 1, includes user agent software that generates the overlay in response to data generated at the production studio and transmitted downstream over the cable network 122 to the set top boxes 124. A user agent embedded in the set top boxes 124 reads the overlay data and generates the interactive overlay on the user's display.

Figure 2:
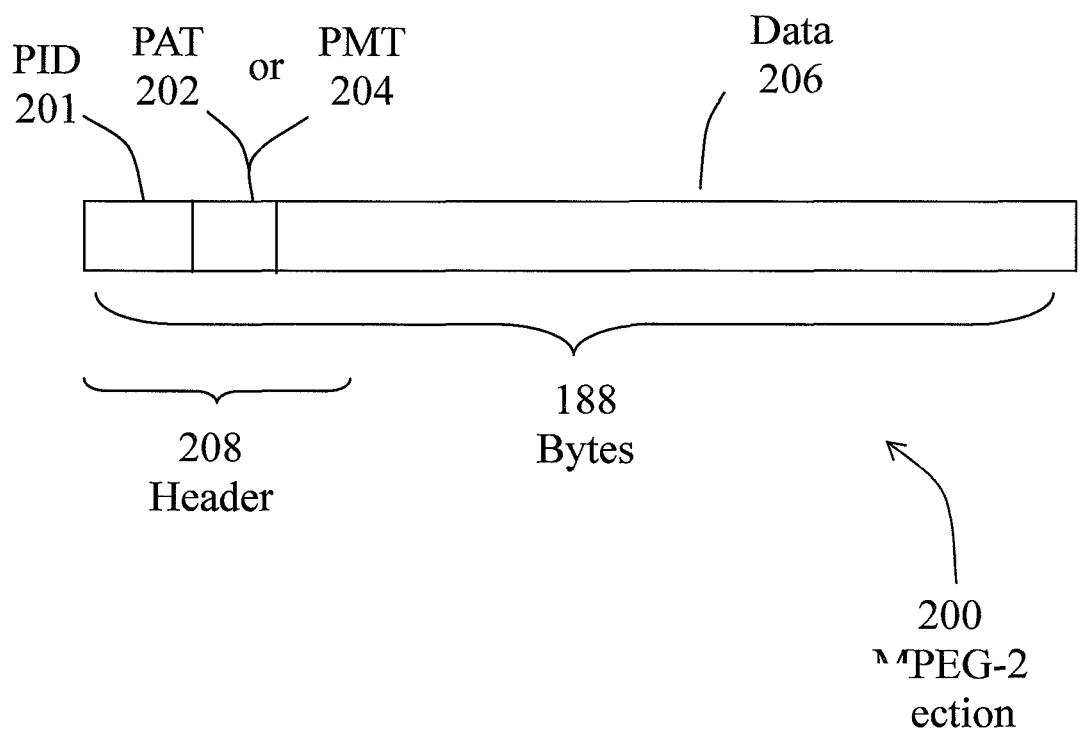
FIG. 2 is a schematic diagram illustrating a section of MPEG-2 data.

FIG. 2 is a diagram illustrating an MPEG-2 section 200 containing data 206 and header information 208, which is generated by the production studios 152 transmitted downstream to the set top boxes 124. The MPEG-2 data section 200 is packetized data that is broken into packets containing 188 bytes. Each packet is referred to as a section of the MPEG-2 data.

At the beginning of each MPEG-2 section 200, that contains 188 bytes, as illustrated in FIG. 2, is a start byte, which has a value of hexadecimal 47. In that regard, the analyzing tool 118 monitors the MPEG-2 stream data for the start byte having a value of hexadecimal 47. The analyzing tool 118 then divides the stream into sections of 188 bytes and checks to see that each section starts with a start byte having a value of hexadecimal 47. The MPEG-2 section 200 includes headers, which may include a program identification byte (PID) 201 and a program allocation table (PAT) 202 or a program mapping table (PMT) 204. The PID is the program identification byte that identifies the stream of data. The PAT 202 is a program allocation table that has a list of all the program mapping tables (PMTs). The PMTs (program mapping tables) provide information that identifies the type of data. For example, the data may be video data, audio data, EBIF application data, EBIF signaling data. EBIF application data describes the interactive overlay and interacts with the user agent in the set top box to create the interactive overlay. The EBIF EISS-signaling data instructs the user agent to display the EBIF data. For example, the EBIF EISS-signaling data may include an auto start signal that persists for five seconds, that functions to automatically start the EBIF application data. The EBIF EISS-signaling data may also include a present command that persists for 20 seconds, for example, that instructs the set top box to display the EBIF application data for 20 seconds. Further, the EBIF EISS-signaling data may include a destroy signal that persists for five seconds, to remove the overlay of the EBIF application data from the user screen. The EBIF application data includes a DSMCC DII signal that describes how the EBIF data is broken into pieces, and instructs the user agent as to how to assemble the data back to its original form. The EBIF application data also includes a program enhancement ID (PEID) that is 22 characters long, and is a unique identifier of the EBIF application data that describes the overlay to be displayed on the user screen. A PEID is assigned to each order that is placed by a production studio, such as production studios 152, illustrated in FIG. 1. The PEID is included with the data and stays with the data throughout the process illustrated in FIG. 1. The PEID is the identification data that is used by the analyzing tool 118 and the centralizing analyzer 164 to display the analyzed data, as well as provide notifications and alarms.

FIG. 3 shows a flow diagram 300 illustrating the operation of the analyzing tool 118. At step 302, the analyzing tool joins the IP multicast network and begins reading data from the Ethernet connection 116. The analyzing tool 118 then reads a block of data containing N-bytes at step 304. The analyzing tool 118 includes a buffer that stores the block of data containing N-bytes. At step 306, the start byte is located by determining the byte that has a value of hexadecimal 47. The data stream of N-bytes is then broken up into 188 byte sections at step 308, which is a standard packet for MPEG-2 data. The analyzing tool 118 counts 188 bytes from the start byte and then determines that the next byte is a subsequent start byte. At step 310, the program identification (PID) data is located. The PID is the unique identifier located in each section of data that identifies the stream to which that section belongs. At step 312, the data is checked to determine if the data includes timing information. The timing information is data that constitutes a program clock reference (PCR). The PCR assists in feeding the data to a display at a constant rate. If the data includes timing information, an internal clock is set at step 314. The process then proceeds to step 318. At step 312, if the section of data does not include timing information, the process proceeds to step 318 to determine if the PID located at step 310 is to be saved.

During configuration of the analyzing tool 118, the PIDs to be saved are identified. For example, PIDs for EBIF application data and PIDs for EBIF EISS-signaling data are identified as PIDs that should be saved by the system. If the PID associated with an MPEG-2 section of data that is identified as a PID to be saved, the data 206 in the MPEG-2 section for that PID is added to a list to be saved at step 320. The list may be stored in high speed RAM buffer. The process then proceeds to step 322.

At step 344 of FIG. 3, a separate offline process is performed. At step 344, the list of PIDs to be saved is checked to determine if the list contains data 206 for any PIDs to be saved. If it does, the data for the listed PIDs is logged to a database in the analyzing tool 118, at step 346. At step 348, the list is cleared. If the list does not contain any data 206 for PIDs to be saved, the process waits at 349 for a predetermined period. After the predetermined period has expired, the process at step 344 again checks to see if the list contains any data 206 for PIDs to be saved. This process continues to monitor the list to determine if data 206 is present for PIDs to be saved in the list and stores the data 206 from the sections identified by the PIDs. The process illustrated at step 344 is a separate offline process because of the fact that data is streaming on the Ethernet input at a very high rate and the data must be processed offline in order to process the data sufficiently fast so that the buffer in the analyzing tool 118 is not overrun.

At step 322 of FIG. 3, the processor in the analyzing tool 118 determines if the PID is program allocation table data (PAT). The program allocation table (PAT) data constitutes a list of the programming mapping tables (PMTs). As explained above, the programming mapping tables identify the type of data in the program stream, such as whether the data is audio data, video data, EBIF application data, EBIF EISS-signaling data, etc. If the PID is a PAT, the PAT table is updated at step 324. The process then determines if there is additional data left at step 316. In other words, the next section of data containing 188 bytes is processed to find the PID at step 310. If there are no additional sections of data left in the buffer, the process returns to step 304, where the buffer reads another block of data containing N-bytes. If the PID is not a PAT, the process proceeds to step 326 to determine if the data is programming mapping table (PMT) data. If the data in the section is PMT data, an updated PMT table is created at step 328. If the data in the section of data is not PMT data, the process proceeds to step 330 to determine if the data is EISS-signaling data. If the data in the section is EISS-signaling data, the EISS data is saved to a list to be logged at step 332. The process then returns to step 316, as described above. A separate offline process is performed again to save the EISS data. At step 344, the list of EISS data is checked to determine if data 206 is present on the list. If data 206 is present, the data 206 is logged to a database at step 346 in the analyzing tool 118 of FIG. 1. After the data has been logged, the list is cleared at step 348. If there is no data on the list, the process waits at step 349 and checks the list periodically and continues to monitor the list. Again, the process is performed offline in order to process the data sufficiently fast so that the buffer is not overrun.

If the data is not EISS data, as determined at step 330 of FIG. 3, the analyzing tool 118 checks to see if the data in the section of data being analyzed is EBIF application data at step 334. If it is not, the process proceeds to step 316. If the data is EBIF application data, the data is assembled at step 336. DII data is read by the analyzing tool 118, which describes how the EBIF data is broken into pieces and indicates how a user agent can put the data together in a DSMCC carousel. Once the data is assembled at step 336, it is determined at step 338 if all the EBIF data has been loaded. If not, the process proceeds to step 316. If all the EBIF application data is loaded, as determined at step 338, the EBIF data is parsed at step 340. At step 342, the EBIF application data is saved to a list to be logged to a database. Again, a separate offline process is performed to save the EBIF application data. At step 344, the list of EBIF application data is checked to determine if data is present in the list. If data is present in the list, the data is logged to a database at step 346. After the data has been logged, the list is cleared at step 348. If there is no data in the list, the process waits at step 349 and checks the list periodically.

Hence, the analyzing tool illustrated in FIG. 3 identifies the EBIF application data and EBIF EISS-signaling data and stores this data with a PEID identifier. The data can then be displayed with the PEID identifier and alarms and notifications can be provided, if desired.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of parsing, displaying and analyzing interactive overlay data in a video data stream that is transmitted to set top boxes for display comprising:
   downloading N-bytes from said data stream;
   identifying start bytes in said N-bytes of said data stream;
   dividing said N-bytes into sections of said data stream;
   identifying enhance television binary interchange format (EBIF) overlay data in said sections that describes an interactive overlay;
   identifying EBIF EISS-signaling data in said sections that comprises command signals that control timing and duration of a display of said EBIF overlay data;
   identifying program enhancement identification data (PEID) associated with said EBIF overlay data and said EBIF EISS-signaling data;
   storing said EBIF overlay data, said EBIF EISS-signaling data and said PEID that is associated with said EBIF overlay data and said EBIF EISS-signaling data;
   displaying said EBIF overlay data and said EBIF EISS-signaling data with said PEID that is associated with said EBIF overlay data and said EBIF EISS-signaling data to provide a visual display of said EBIF overlay data and said EBIF EISS-signaling data that is associated with said PEID;
   automatically generating an alarm whenever said EBIF overlay data is corrupted or said EBIF EISS-signaling data is corrupted.

2. A system for parsing, displaying and analyzing interactive overlay data in a video data stream that is transmitted to set top boxes for display comprising:
   an analyzing tool comprising:
      a buffer that stores N-bytes of data from said data stream;
      a processor that divides said N-bytes of data into sections, identifies enhanced television binary interchange format (EBIF) overlay data in said sections that describes an interactive overlay, identifies EBIF EISS-signaling data in said sections that comprises command signals that control timing and duration of the display of said EBIF overlay data and associates program enhancement identification data (PEID) with said EBIF overlay data and said EBIF EISS-signaling data for sections containing said overlay data and said signaling data and generates an alarm signal whenever said EBIF overlay data or said EBIF EISS-signaling data is corrupted;
   a storage device that stores said sections containing said EBIF overlay data and said EBIF EISS-signaling data with said PEID;
   a display that displays said EBIF overlay data and said EBIF EISS-signaling data with said PEID.

\* \* \* \* \*